(12) United States Patent
Yu et al.

(10) Patent No.: US 7,146,198 B2
(45) Date of Patent: Dec. 5, 2006

(54) MOBILE PHONE HAVING A SIDE BUTTON WHICH CAN FIX A BATTERY AND ADJUST VOLUME

(75) Inventors: Dung-Shiau Yu, Tai-Chung Hsien (TW); Jen-Cheng Lai, Tao-Yuan Hsien (TW)

(73) Assignee: BenQ Corporation, Tao-Yuan Hsien (TW)

( * ) Notice: Subject to any disclaimer, the term of this patent is extended or adjusted under 35 U.S.C. 154(b) by 91 days.

(21) Appl. No.: 10/904,133

(22) Filed: Oct. 26, 2004

(65) Prior Publication Data
US 2005/0096104 A1    May 5, 2005

(30) Foreign Application Priority Data
Oct. 31, 2003   (TW) ............................... 92130571 A

(51) Int. Cl.
*H04M 1/00*  (2006.01)
*H04M 9/00*  (2006.01)

(52) U.S. Cl. .............................. 455/575.1; 379/433.08; 379/433.06

(58) Field of Classification Search ................ 455/575, 455/558, 347, 348, 349, 425, 550, 572, 575.1; 379/433.08, 433.06; 320/107
See application file for complete search history.

(56) References Cited

U.S. PATENT DOCUMENTS

| | | | |
|---|---|---|---|
| 6,157,545 A * | 12/2000 | Janninck et al. | 361/814 |
| 6,490,436 B1 * | 12/2002 | Kaiwa et al. | 455/90.1 |
| 6,535,750 B1 * | 3/2003 | Van Gen | 455/558 |

* cited by examiner

*Primary Examiner*—Neghmeh Mehrpour
(74) *Attorney, Agent, or Firm*—Winston Hsu

(57) ABSTRACT

A mobile phone includes a housing, a circuit board, a side button and a battery. The circuit board is installed in the housing. The side button is installed on the housing in a slidable manner. The battery is installed on the housing for supplying power to the mobile phone and an elastic member is coupled between the housing and the side button. The circuit board includes a control circuit for controlling the operation of the mobile phone. When the side button is triggered, the control circuit produces a control signal. The side button includes an engaging hook for engaging with a recess of the battery so as to fix the battery on the housing.

9 Claims, 8 Drawing Sheets

MOBILE PHONE HAVING A SIDE BUTTON WHICH CAN FIX A BATTERY AND ADJUST VOLUME

BACKGROUND OF INVENTION

1. Field of the Invention

The present invention relates to a mobile phone, and more specifically, to a mobile phone with a side button not only for fixing a battery in the mobile phone but also for adjusting the volume of the mobile phone.

2. Description of the Prior Art

With the higher development of wireless communication system in the modernized information society, by using a mobile phone, people have been capable of talking, sending messages, or exchanging information at any place and anytime In order to work normally for a longer period of time, a mobile phone has been designed to utilize a detachable external battery to supply required power. Unlike a home-used telephone, a mobile phone must be carried in hand easily and designed for use in sending or receiving information anywhere at anytime. Therefore, it is not allowable that a fixed battery, being the power supply, has the problem of being easily removed while the owner is using. A complicated fastening mechanism for fixing a battery is not desirable because it becomes troublesome during the installation of the battery, and also, in some cases, adds extra weight to the mobile phone.

Please refer to FIG. 1 and FIG. 2. FIG. 1 is a front view of a mobile phone 10 according to the prior art. FIG. 2 is a back view of a mobile phone 10 depicted in FIG. 1. A mobile phone 10 includes a housing 11, a side button 12, a battery 14, and a fixing device 16. The side button 12 is installed on the housing 11 for adjusting the output volume of the mobile phone 10. The battery 14 is installed in the housing 11 for supplying power to the mobile phone. The fixing device 16 is used to fix the battery 14 to the housing 11 of the mobile phone 10. The fixing device 16 can move back and forth along the direction indicated by the arrow in the FIG. 2 so as to achieve the purpose of fastening or removing the battery 14.

The separate positions occupied by the fixing device 16 and the side button 12, however, this may influence the component layout in the circuit design of the mobile phone 10. Furthermore, to incorporate the additional space occupied by of the design of such a fixing device 16, more complicated steps in the mold injection of the mobile phone 10 are required and also results in an inharmonious appearance for the phone housing. Consequently, cost and complications of manufacture of the mobile phone are increased.

SUMMARY OF INVENTION

It is therefore an objective of the claimed invention to provide a mobile phone having a side button not only for fixing a battery but also adjusting the volume of the mobile phone to solve the above-mentioned problems.

According to the claimed invention, a mobile phone including a housing and a circuit board installed in the housing for controlling the operation of the mobile phone is provided. The circuit board comprises a control circuit. A side button is installed on the housing of the mobile phone in a slidable manner for producing a control signal when the side button is triggered. The side button comprises an elastic member. A battery installed on the housing for supplying power to the mobile phone, the battery having a recess used to be engaged with an engaging hook of the side button so as to fix the battery to the housing. An elastic member for pushing the side button to engage the engaging hook of the side button with the recess of the battery is utilized whereby one end of the elastic member fixed to the housing and the other end connected to the side button.

It is an advantage of the claimed invention that the side button can not only fix the battery to the housing but also adjust the volume of the mobile phone. Therefore, it saves not only space but also the cost.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
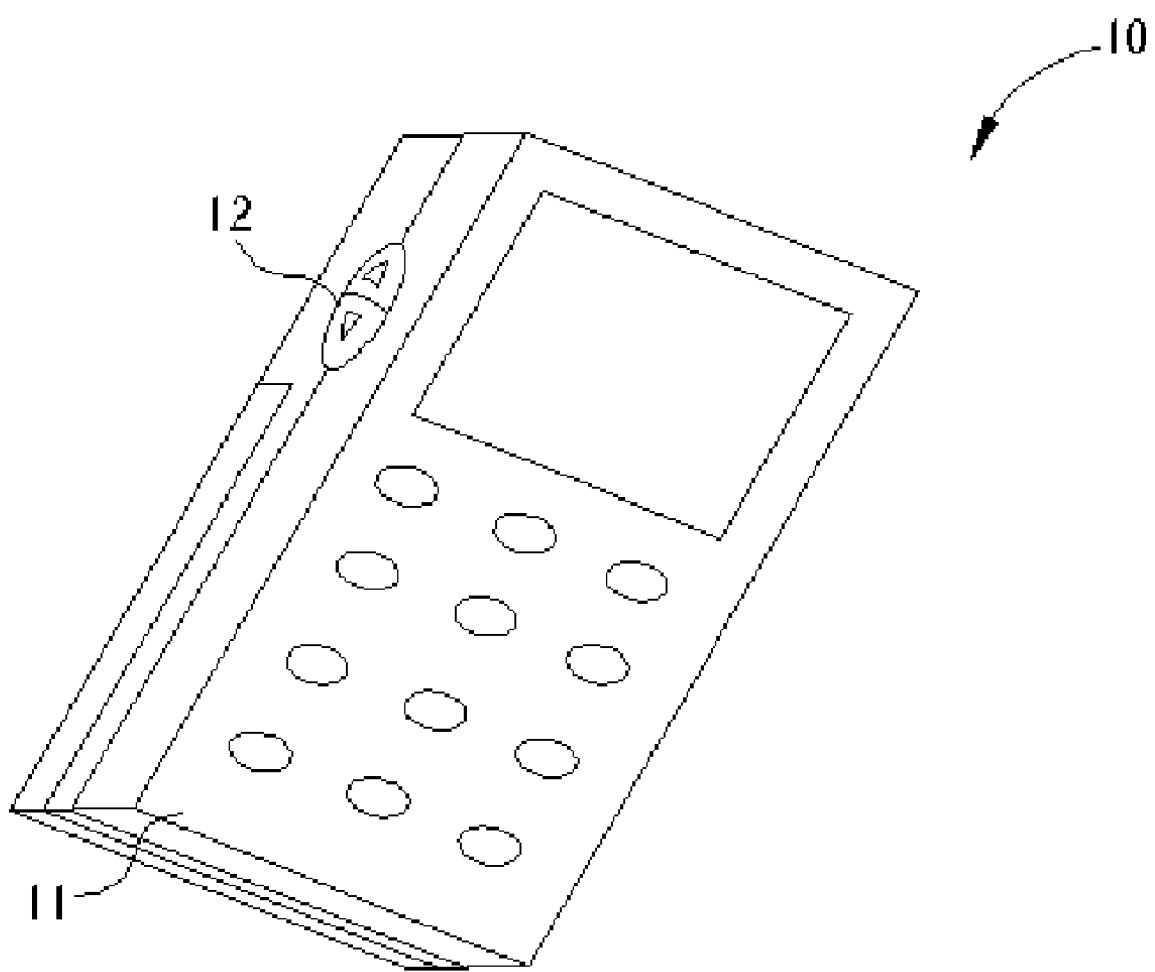
FIG. 1 is a front view of a mobile phone according the prior art.
Figure 2:
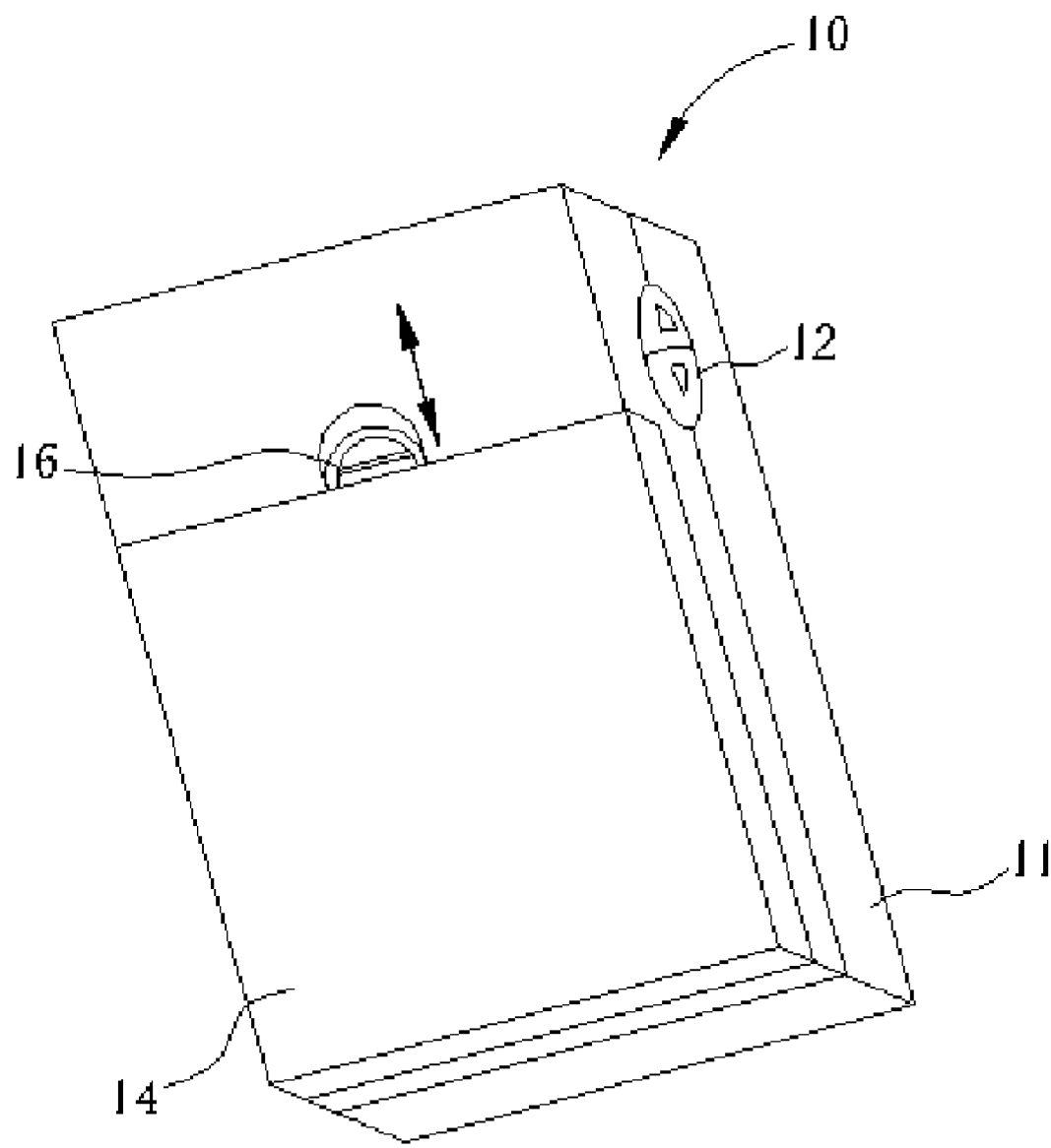
FIG. 2 is a back view of the mobile phone shown in FIG. 1
Figure 3:
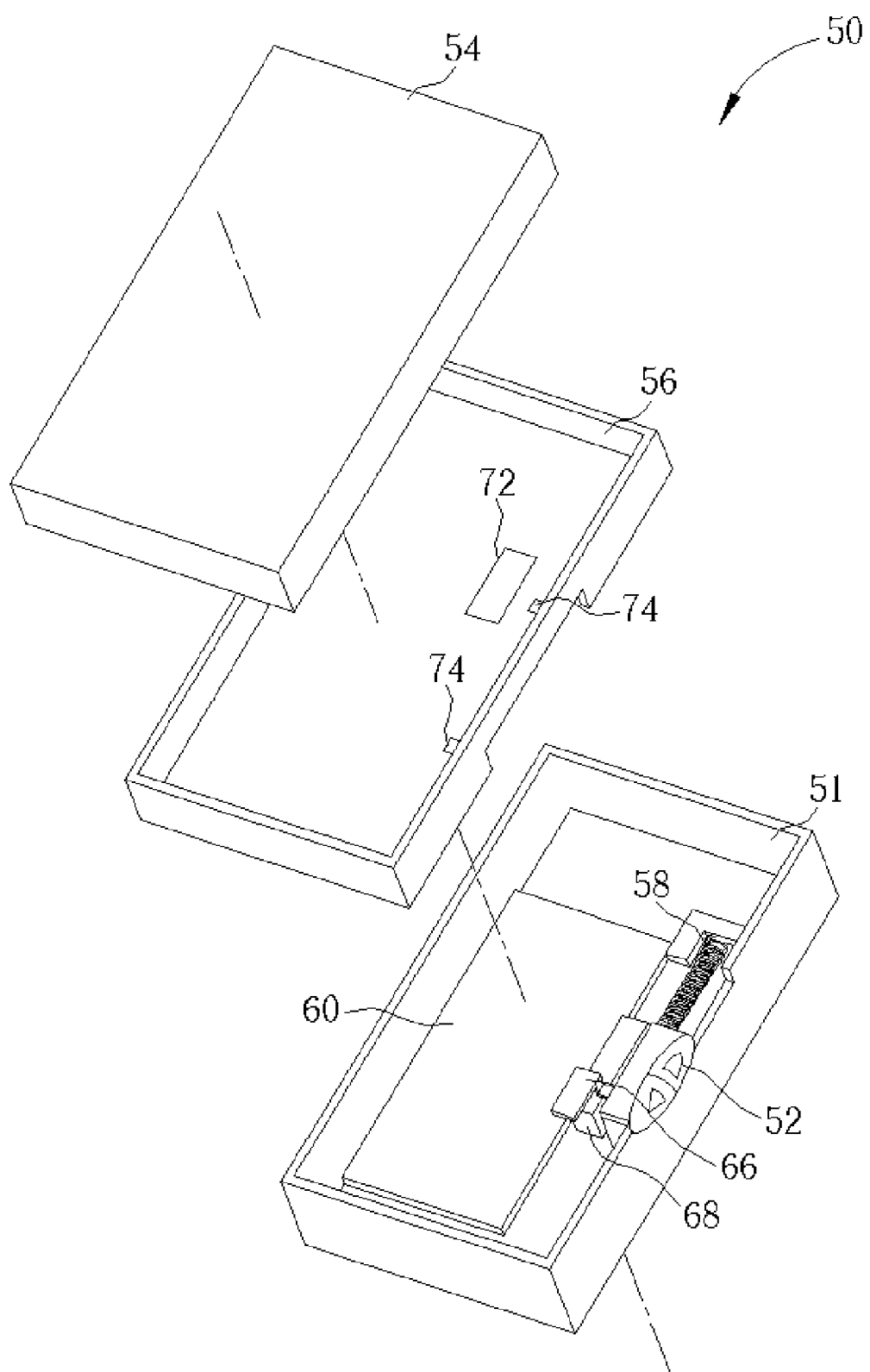
FIG. 3 is a diagram of a mobile phone according to the present invention.

Please refer to FIG. 3. FIG. 3 is a diagram of a mobile phone 50 according to the present invention. A mobile phone 50 comprises a housing 51, a side button 52, a battery 54, a lower case 56, an elastic member 58, and a circuit board 60. The circuit board 60 is installed in the housing 51, and a control circuit (not shown) on the circuit board 60 can control the operation of the mobile phone 50. The side button 52 is installed on the housing 51 in a slidable manner for producing a control signal when it is pressed. The battery 54 is installed in the housing 51 for supplying power to the mobile phone 50. The elastic member 58, in which one end is fixed to the housing 51 and the other end is connected to the side button 52, can be a spring.

Figure 4:
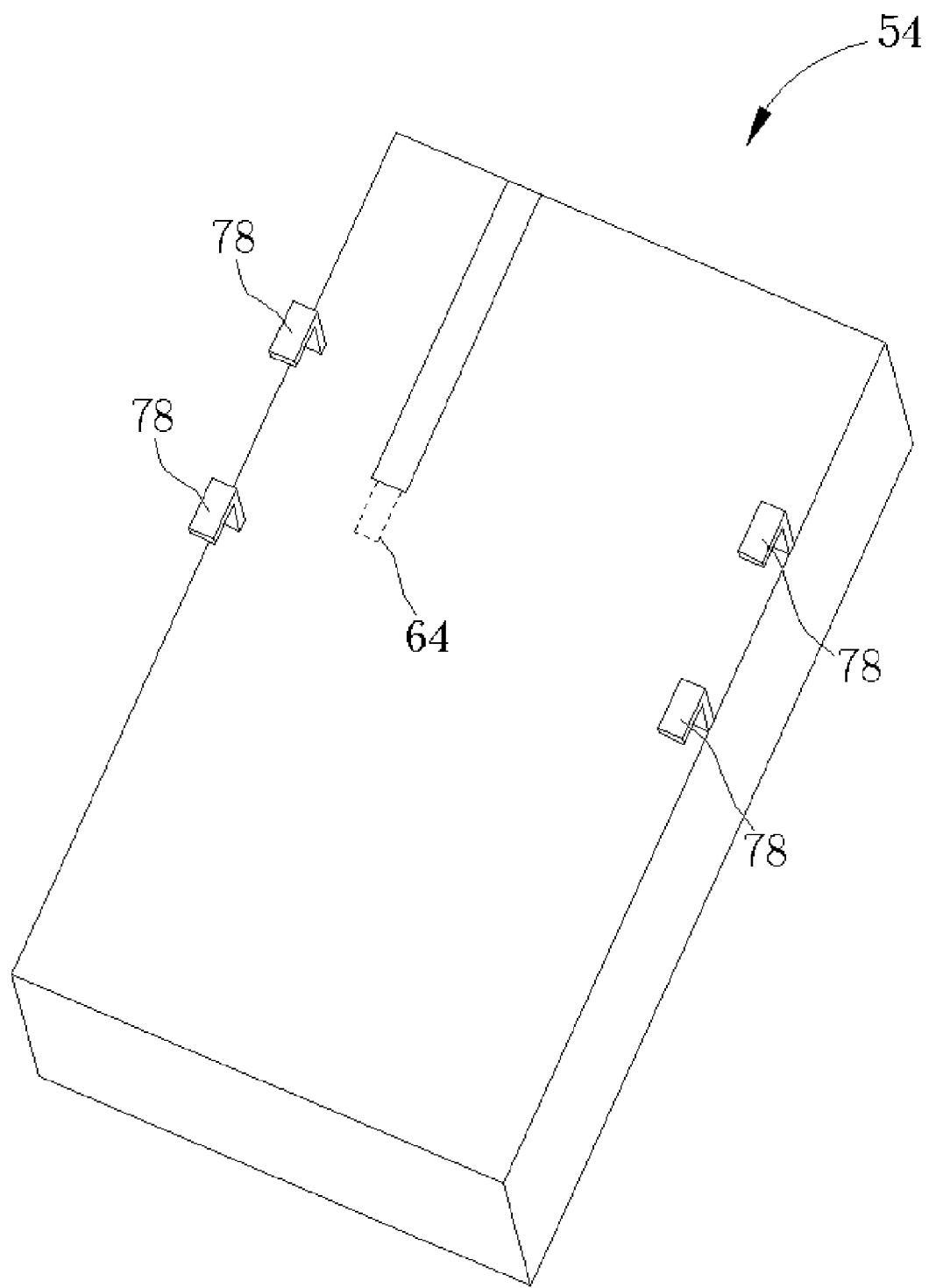
FIG. 4 is a diagram of a battery depicted in FIG. 3.

Please refer to FIG. 3 in conjunction with FIG. 4. FIG. 4 is a diagram of the battery 54 depicted in the FIG. 3. The mobile phone 50 further comprises a connector 68. The side button 52 comprises a monolithic engaging hook 66, which moves along with the side button 52. The battery 54 has a recess 64 and a plurality of fixing hooks 78 in its housing, the recess 64 can be a groove or a dimple for accommodating the engaging hook 66 of the side button 52 to fix the battery 52 on the housing 51. The lower case 56 is installed between the battery 54 and the circuit board 60 to separate the battery 54 and the circuit board 60. The lower case 56 includes an opening 72 and a plurality of engaging sinks 74 to engage a plurality of fixing hooks 78 of the battery 54 to strengthen the integration between the battery 54 and the lower case 56. In another preferred embodiment, however, the lower case 56 does not necessarily require engaging sinks 74, and the battery 54 does not necessarily have fixing hooks 78 as well, the engaging hook 66 of the side button 52 and the recess 64 of the battery 54 can fix the battery 54 on the housing effectively.

Figure 5:
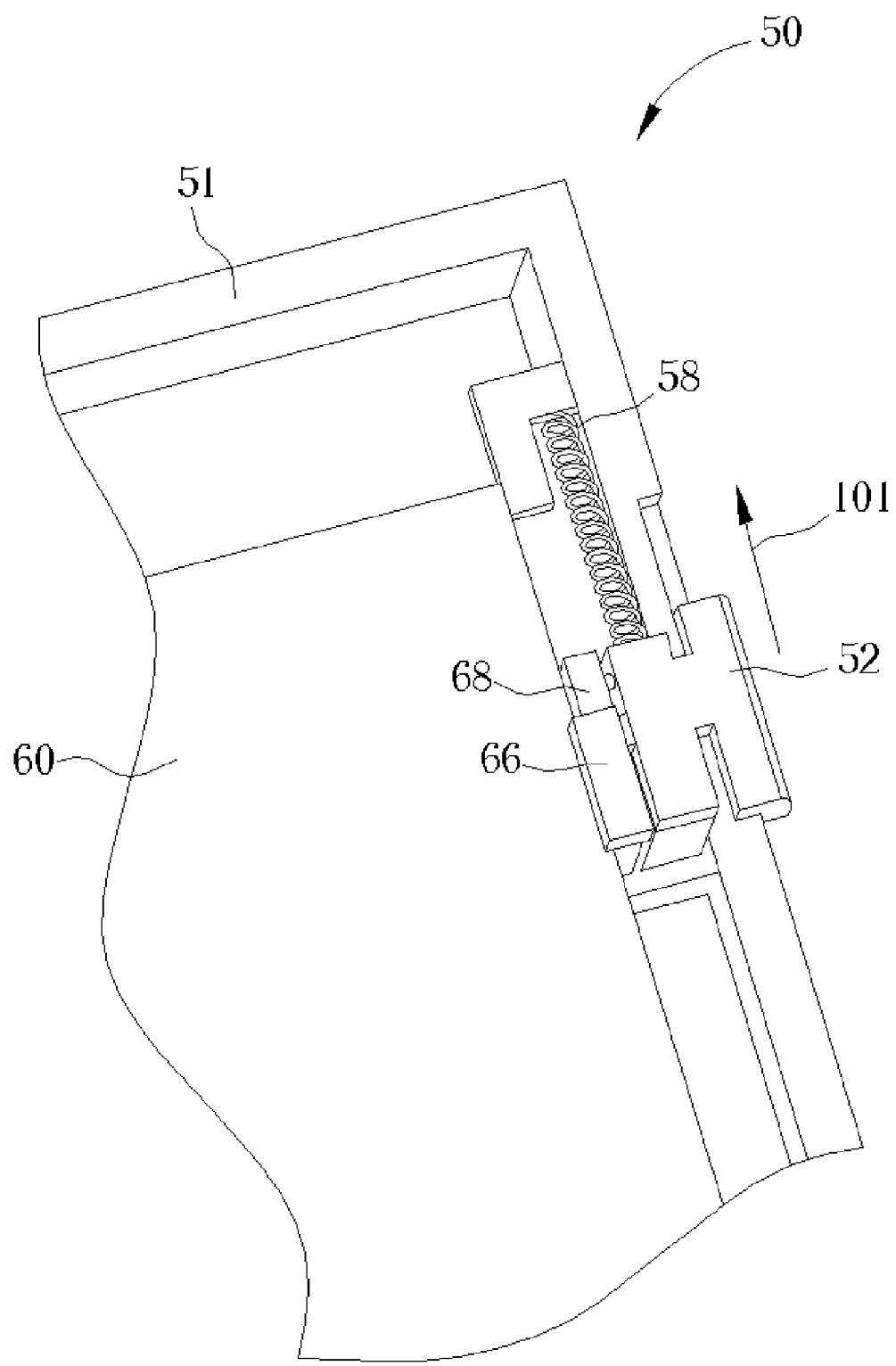
FIG. 5 and FIG. 6 show relative position of the side button and the elastic member during the installation of the battery according to the present invention.
Figure 6:
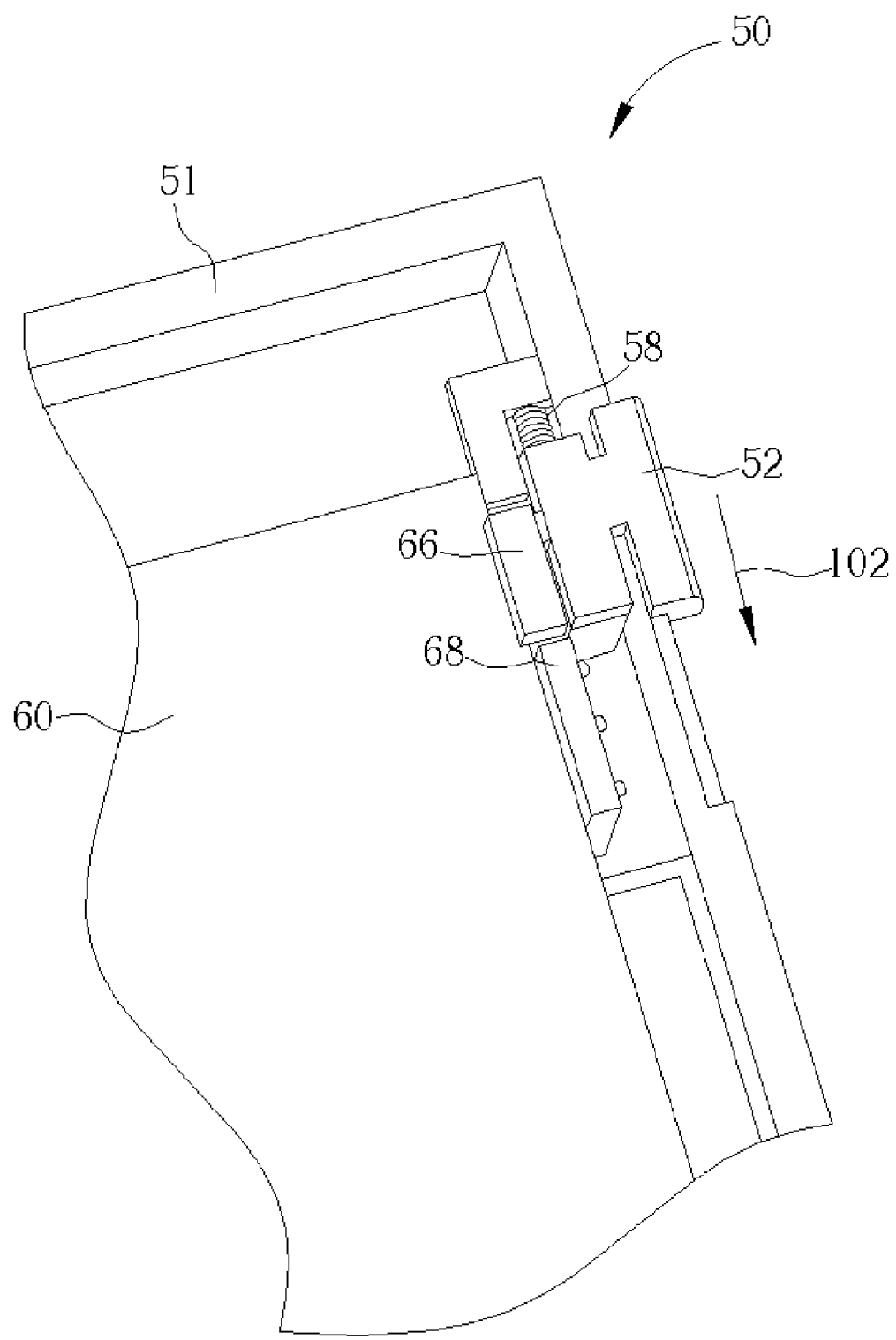

The manner of installing the battery 54 on the housing 51 of the mobile phone 50 is introduced as follows. Please refer to FIG. 3 in conjunction with FIG. 5 and FIG. 6. FIG. 5 and FIG. 6 show the relative position of the side button 52 and the elastic member 58 when installing the battery 54. From FIG. 3, the lower case 56 must be installed on the housing 51 to separate the battery 54 and the circuit board 60. The engaging hook 66 can protrude out of an opening 72 of the lower case 56. In order to depict the process of installing the battery 54 on the housing 51 of the mobile phone 50, the battery 54 and the lower case 56 are not shown in FIG. 5 and FIG. 6; but the relative positions of the side button 52, the elastic member 58, the circuit board 60, and the connector 68 are shown. Apply a pushing force on the side button 52 in a first direction 101 from a first position shown in FIG. 5 to a second position shown in FIG. 6 before installing the battery 54, and the engaging hook 66 will move along the first direction 101 as the side button 52 moves. At this time, press the battery 54 toward the housing 51 when the position of the recess 64 is aligning correspondingly to the engaging hook 66. Then, release the force and the elastic member 58 will push the side button 52 along with the engaging hook 66 from the second position shown in FIG. 6 back to the first position shown in FIG. 5. Consequently, the engaging hook 66 of the side button 52 can engage the recess 64 of the battery 54 to achieve the purpose of fixing the battery 54. Of course, the engagement of the fixing hooks 78 on the battery 54 with the engaging sinks 74 on the lower case 56 can enhance the fixing effect of the battery 54. In addition, because the side button 52 disengages from the connector 68 and thus loses electrical connection with the connector 68, the side button 52 at the second position shown in FIG. 6 is under the invalid status. Once the side button 52 returns to the first position after the battery 54 is fixed, the side button 52 can connect electrically with the connector 68. At this time, the signal produced by triggering the side button 52 can be delivered through the connector 68 to the control circuit of the circuit board 60 to adjust the output volume of the mobile phone 50.

Figure 7:
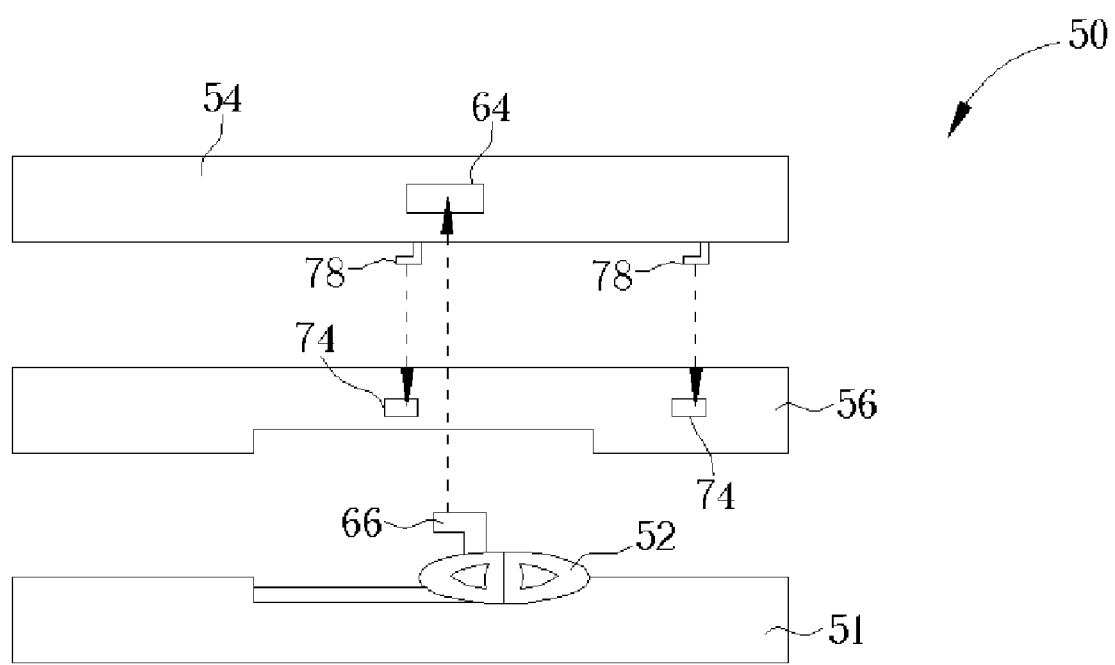
FIG. 7 is a perspective drawing of the battery, the lower case, and the housing according to the present invention.

Please refer to FIG. 7. FIG. 7 is a perspective view of installing the battery 54, the lower case 56, and the housing 51 according to the present invention. As shown in FIG. 7, fixing hook 78 on the battery 54 fits with the engaging sink 74 of the lower case 56, and the engaging hook 66 engages with the recess 64 of the battery 54 through the lower case 56. Hence, it prevents the battery 54 from being removed from the housing 51 and the lower case 56.

Figure 8:
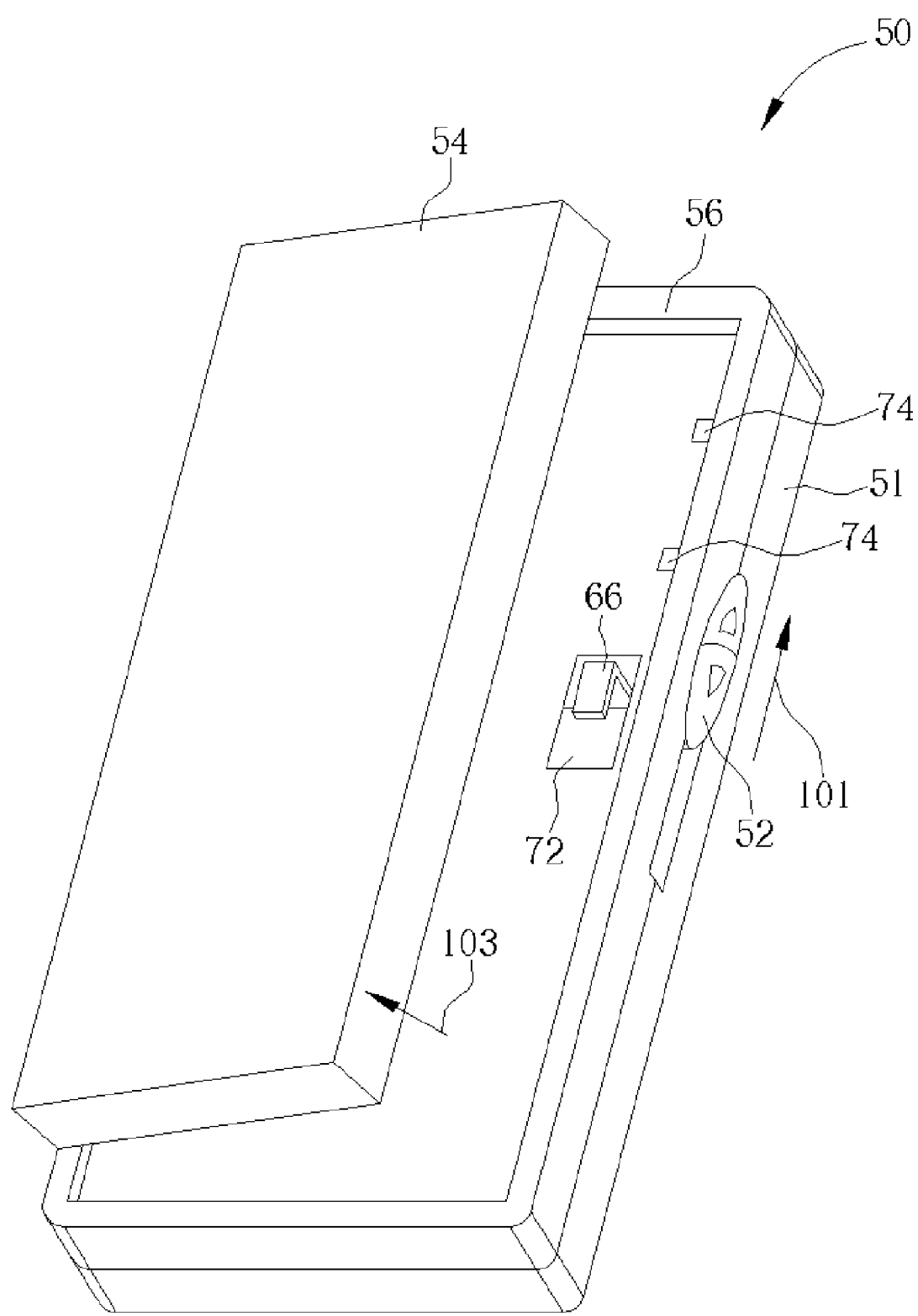
FIG. 8 is a diagram of removing a battery from the housing according to the present invention.

Please refer to FIG. 8. FIG. 8 is a diagram of removing the battery 54 from the housing 51 according to the present invention. Similarly to the above-mentioned process, when intending to remove the battery 54, a force is applied on the side button 52, moving the side button 52 from the first position shown in FIG. 5 to the second position shown in FIG. 6. At this moment, the engaging hook 66 will come off from the recess 64, leading to the battery 54 to be disassembled from the housing 51 in a third direction 103.

Please notice that the function of the side button 52 is not only limited to adjusting the volume but also can be used for other relative operations of the mobile phone 50.

Compared with the prior art, the side button of the present invention not only controls the volume of the mobile phone but also fixes the battery. Such design will decrease additional steps of casting molds and outward performance on the fixing member in the prior art, and it leads to reduced risk in manufacturing and to consistency in the performance of the mobile phone.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mobile phone comprising:
   a housing;
   a circuit board, installed in the housing, for controlling the operation of the mobile phone, the circuit board comprising a control circuit and a connector;
   a battery, installed on the housing, for supplying power to the mobile phone, the battery comprising a recess;
   a side button comprising an engaging hook for engaging the recess of the battery in order to fix the battery to the housing and to couple the side button with the connector, the side button being installed on the housing in a slidable manner for controlling the control circuit to produce a control signal as the side button is triggered when the side button couples with the connector; and
   an elastic member for pushing the side button to engage the engaging hook with the recess of the battery, wherein one end of the elastic member is fixed to the housing and the other end is connected to the side button.

2. The mobile phone of claim 1 wherein the recess is a groove.

3. The mobile phone of claim 1 wherein the elastic member is a spring.

4. The mobile phone of claim 1 further comprising a lower case, coupled between the battery and the circuit board, for separating the battery and the circuit board.

5. The mobile phone of claim 4 wherein the battery further comprises a plurality of fixing hooks, and the lower case comprises a plurality of engaging sinks for engaging with the fixing hooks to reinforce the integration between the battery and the lower case.

6. The mobile phone of claim 1 wherein the control signal generated by triggering the side button is used to adjust output volume of the mobile phone.

7. A mobile phone comprising:
   a housing;
   a circuit board, installed in the housing, for controlling the operation of the mobile phone, the circuit board comprising a control circuit and a connector;
   a battery, installed on the housing, for supplying power to the mobile phone, the battery comprising a recess; and
   a side button comprising an engaging hook for engaging the recess of the battery in order to fix the battery to the housing and to couple the side button with the connector, the side button being installed on the housing in a slidable manner for controlling the control circuit to produce a control signal as the side button is triggered when the side button couples with the connector.

8. The mobile phone of claim 1 wherein the side button is not coupled with the connector when the engaging hook disengages from the recess of the battery.

9. The mobile phone of claim 7 wherein the side button is not coupled with the connector when the engaging hook disengages from the recess of the battery.

\* \* \* \* \*